US008456427B2

(12) United States Patent
Bytheway

(10) Patent No.: US 8,456,427 B2
(45) Date of Patent: Jun. 4, 2013

(54) FLOATING CAPACITIVE COUPLERS USED TO ENHANCE SIGNAL COUPLING IN A CAPACITIVE TOUCHPAD

(75) Inventor: Jared G. Bytheway, Sandy, UT (US)

(73) Assignee: Cirque Corporation, Salt Lake City, UT (US)

( * ) Notice: Subject to any disclaimer, the term of this patent is extended or adjusted under 35 U.S.C. 154(b) by 1068 days.

(21) Appl. No.: 12/059,842

(22) Filed: Mar. 31, 2008

(65) Prior Publication Data
US 2008/0245582 A1 Oct. 9, 2008

Related U.S. Application Data

(60) Provisional application No. 60/908,862, filed on Mar. 29, 2007.

(51) Int. Cl.
G06F 3/41 (2006.01)

(52) U.S. Cl.
USPC .......................................... 345/173; 345/178

(58) Field of Classification Search
USPC ................ 345/157–174, 55, 211; 178/18.06; 324/658–660
See application file for complete search history.

(56) References Cited

U.S. PATENT DOCUMENTS

| 4,758,830 | A * | 7/1988 | Levien et al. | 345/174 |
|---|---|---|---|---|
| 6,587,093 | B1 * | 7/2003 | Shaw et al. | 345/163 |
| 7,075,523 | B2 * | 7/2006 | Marten et al. | 345/173 |
| 7,212,189 | B2 * | 5/2007 | Shaw et al | 345/163 |
| 7,218,124 | B1 * | 5/2007 | Mackey et al. | 324/660 |
| 7,382,139 | B2 * | 6/2008 | Mackey | 324/660 |
| 7,548,073 | B2 * | 6/2009 | Mackey et al. | 324/660 |
| 7,692,638 | B2 * | 4/2010 | Land et al. | 345/173 |
| 7,764,281 | B2 * | 7/2010 | Derichs | 345/211 |
| 7,817,135 | B2 * | 10/2010 | Shaw et al. | 345/163 |
| 8,085,260 | B2 * | 12/2011 | Derichs | 345/211 |
| 2002/0063688 | A1 * | 5/2002 | Shaw et al. | 345/163 |
| 2002/0093481 | A1 * | 7/2002 | Kehlstadt | 345/156 |
| 2003/0067451 | A1 * | 4/2003 | Tagg et al. | 345/174 |
| 2003/0156098 | A1 * | 8/2003 | Shaw et al. | 345/163 |
| 2004/0189617 | A1 * | 9/2004 | Gerpheide et al. | 345/174 |
| 2006/0017701 | A1 * | 1/2006 | Marten et al. | 345/173 |
| 2006/0017710 | A1 * | 1/2006 | Lee et al. | 345/173 |
| 2006/0038783 | A1 * | 2/2006 | Shaw et al. | 345/163 |
| 2006/0238443 | A1 * | 10/2006 | Derichs | 345/55 |
| 2007/0176608 | A1 * | 8/2007 | Mackey et al. | 324/660 |
| 2008/0006453 | A1 * | 1/2008 | Hotelling | 178/18.06 |
| 2008/0007539 | A1 * | 1/2008 | Hotelling | 345/173 |
| 2008/0158184 | A1 * | 7/2008 | Land et al. | 345/173 |
| 2009/0273573 | A1 * | 11/2009 | Hotelling | 345/173 |
| 2011/0001703 | A1 * | 1/2011 | Shaw et al. | 345/163 |

* cited by examiner

Primary Examiner — Prabodh M Dharia
(74) Attorney, Agent, or Firm — Morris O'Bryant Compagni, PC

(57) ABSTRACT

A capacitive touchpad comprised of drive electrodes and at least one sense electrodes disposed on or within an insulating substrate material, wherein an electrically floating capacitive coupler is disposed adjacent to both the drive electrodes and the sense electrode to thereby enhance signal coupling between the drive electrodes and the sense electrode caused by introduction of a pointing object.

21 Claims, 5 Drawing Sheets

FLOATING CAPACITIVE COUPLERS USED TO ENHANCE SIGNAL COUPLING IN A CAPACITIVE TOUCHPAD

CROSS REFERENCE TO RELATED APPLICATIONS

This document claims priority to and incorporates by reference all of the subject matter included in the provisional patent application having Ser. No. 60/908,862 and filed on Mar. 29, 2007.

BACKGROUND OF THE INVENTION

1. Field of the Invention

This invention relates generally to capacitance sensitive touchpads. Specifically, the invention relates to enhancing coupling between drive electrodes and sense electrodes by enhancing coupling when a pointing object is present.

2. Description of Related Art

To understand the capacitive touchpad technology used in the present invention, it is useful to examine one embodiment of touchpad technology that does not use but can be adapted to use the present invention. Specifically, the touchpad technology of CIRQUE® Corporation used for touch and proximity sensing will now be explained.

The CIRQUE® Corporation touchpad is a mutual capacitance-sensing device and an example is illustrated as a block diagram in FIG. 1. In this touchpad 10, a grid of X (12) and Y (14) electrodes and a sense electrode 16 is used to define the touch-sensitive (and proximity sensitive) area 18 of the touchpad. Typically, the touchpad 10 is a rectangular grid of approximately 16 by 12 row and column electrodes, or 8 by 6 electrodes when there are space constraints. Interlaced with these X (12) and Y (14) (row and column) electrodes is a single sense electrode 16. All position measurements are made through the sense electrode 16.

The CIRQUE® Corporation touchpad 10 measures an imbalance in electrical charge on the sense line 16. When no pointing object is on or in proximity to the touchpad 10, the touchpad circuitry 20 is in a balanced state, and there is no charge imbalance on the sense line 16. When a pointing object creates imbalance because of capacitive coupling when the object approaches or touches a touch surface (the sensing area 18 of the touchpad 10), a change in capacitance occurs on the electrodes 12, 14. What is measured is the change in capacitance, but not the absolute capacitance value on the electrodes 12, 14. The touchpad 10 determines the change in capacitance by measuring the amount of charge that must be injected onto the sense line 16 to reestablish or regain balance of charge on the sense line.

The system above is utilized to determine the position of a finger on or in proximity to a touchpad 10 as follows. This example describes row electrodes 12, and is repeated in the same manner for the column electrodes 14. The values obtained from the row and column electrode measurements determine an intersection which is the centroid of the pointing object on or in proximity to the touchpad 10.

In the first step, a first set of row electrodes 12 are driven with a first signal from P, N generator 22, and a different but adjacent second set of row electrodes are driven with a second signal from the P, N generator. The touchpad circuitry 20 obtains a value from the sense line 16 using a mutual capacitance measuring device 26 that indicates which row electrode is closest to the pointing object. However, the touchpad circuitry 20 under the control of a microcontroller 28 cannot yet determine on which side of the row electrode the pointing object is located, nor can the touchpad circuitry 20 determine just how far the pointing object is located away from the electrode. Thus, the system shifts by one electrode the group of electrodes 12 to be driven. In other words, the electrode on one side of the group is added, while the electrode on the opposite side of the group is no longer driven. The new group is then driven by the P, N generator 22 and a second measurement of the sense line 16 is taken.

From these two measurements, it is possible to determine on which side of the row electrode the pointing object is located, and how far away. Pointing object position determination is then performed by using an equation that compares the magnitude of the two signals measured.

The sensitivity or resolution of the CIRQUE® Corporation touchpad is much higher than the 16 by 12 grid of row and column electrodes implies. The resolution is typically on the order of 960 counts per inch, or greater. The exact resolution is determined by the sensitivity of the components, the spacing between the electrodes 12, 14 on the same rows and columns, and other factors that are not material to the present invention.

The process above is repeated for the Y or column electrodes 14 using a P, N generator 24

Although the CIRQUE® Corporation touchpad described above uses a grid of X and Y electrodes 12, 14 and a separate and single sense electrode 16, the function of the sense electrode can actually be performed by the X or Y electrodes 12, 14 by using multiplexing. Thus, when the X electrodes 12 are being driven with a signal, the Y electrodes 14 can function as sense electrodes. Likewise, the Y electrodes can be driven and the X electrodes then function as the sense electrodes. A touchpad design with or without a dedicated sense electrode can be used.

BRIEF SUMMARY OF THE INVENTION

In a preferred embodiment, the present invention is a capacitive touchpad comprised of drive electrodes and at least one sense electrodes disposed on or within an insulating substrate material, wherein an electrically floating capacitive coupler is disposed adjacent to both the drive electrodes and the sense electrode to thereby enhance signal coupling between the drive electrodes and the sense electrode caused by introduction of a pointing object.

These and other objects, features, advantages and alternative aspects of the present invention will become apparent to those skilled in the art from a consideration of the following detailed description taken in combination with the accompanying drawings.

DETAILED DESCRIPTION OF THE INVENTION

Reference will now be made to the drawings in which the various elements of the present invention will be given numerical designations and in which the invention will be discussed so as to enable one skilled in the art to make and use the invention. It is to be understood that the following description is only exemplary of the principles of the present invention, and should not be viewed as narrowing the claims which follow.

Figure 2:
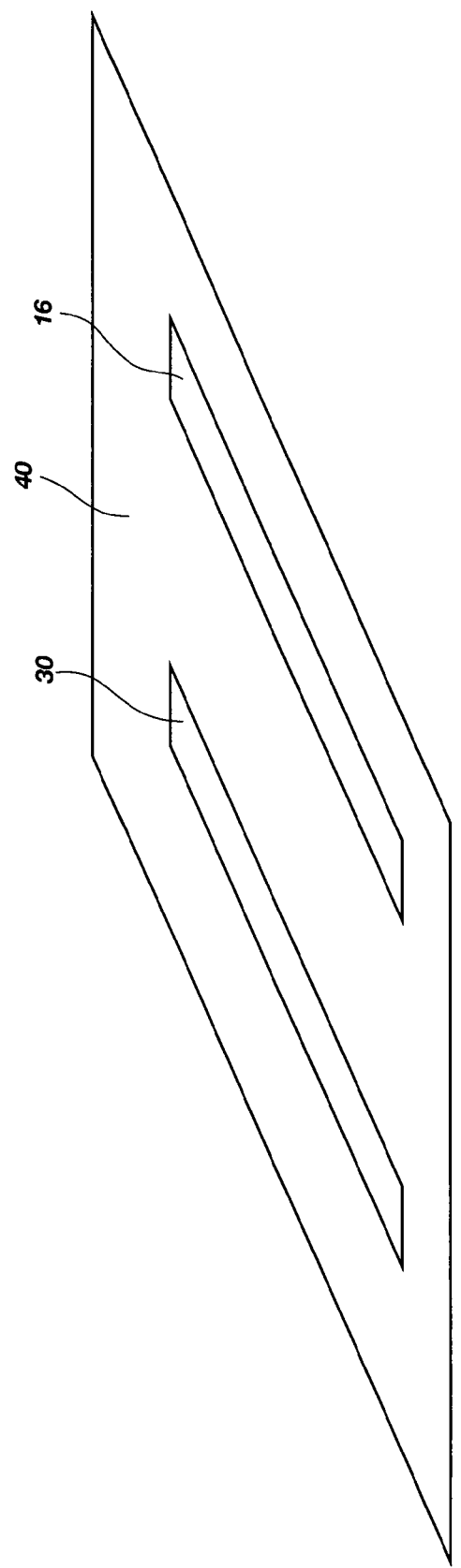
FIG. 2 is a close-up perspective view of a segment of a drive electrode and a sense electrode from the prior art.

FIG. 2 is provided to illustrate a small portion of any capacitive touchpad that can be improved by the present invention. Specifically, FIG. 2 shows just two electrodes of what are most likely a plurality of electrodes that are used in a touch or proximity sensitive capacitive touchpad as described in the prior art. FIG. 2 shows one small segment of a drive electrode (X or Y) 30 and a sense electrode 16. In this embodiment, the drive electrode 30 and the sense electrode 16 are co-planar, but these electrodes can also be disposed in different planes as will be shown in subsequent figures.

Figure 1:
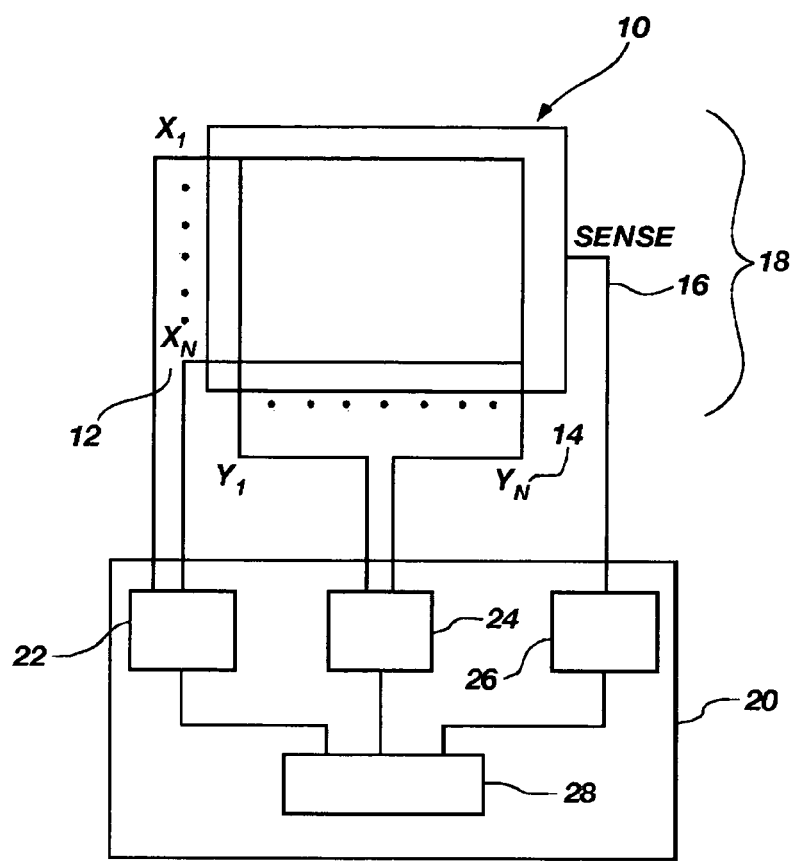
FIG. 1 is a block diagram of a touchpad as taught be the prior art, and which is adapted to function with the present invention.

Another aspect of FIG. 2 is that the drive electrode 30 and the sense electrode 16 are shown as being parallel. It should be understood that the drive electrode 30 and the sense electrode 16 do not have to be parallel but can be in any desired arrangement, including orthogonal in separate planes. What is important is that the drive electrode 30 and the sense electrode 16 are both present in a sensing area 18 (see FIG. 1) of a capacitive touchpad 10.

It should also be understood that FIG. 2 is showing the drive electrode 30 and the sense electrode as they can be disposed within or on a substrate 40. The substrate 40 is any suitable insulting material that will hold the drive electrode and the sense electrode 16 so as to have a specific spacing. Typically, the substrate 40 is a printed circuit board in the case that the capacitive touchpad 10 is not part of a touchscreen, or is some clear substrate material such as MYLAR™ when the capacitive touchpad is disposed on top of a display screen. What is important is that the substrate be comprised of an insulating material, and capable of disposing electrodes in layers when electrodes need to be disposed in overlapping arrangements.

Figure 3:
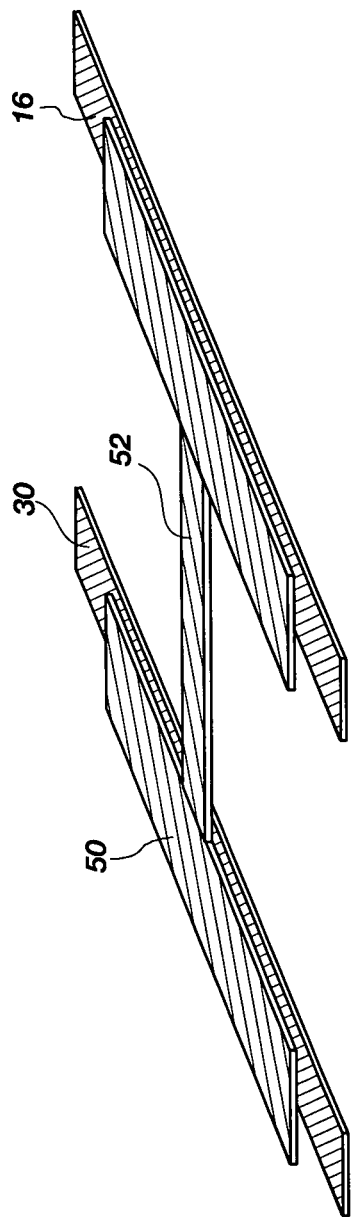
FIG. 3 is a close-up view of the segment of the drive electrode and the sense electrode, but now having an electrically floating capacitive coupler disposed adjacent to the electrodes.

FIG. 3 is a perspective view of the same drive electrode 30 and sense electrode 16 as shown in FIG. 2. In addition, an electrically floating capacitive coupler 50 is now disposed adjacent to the drive electrode 30 and the sense electrode 16 with a bridge 52 between ends thereof. The floating capacitive coupler 50 is shown suspended over the drive electrode 30 and the sense electrode 16. This is possible when the substrate 40 provides multiple layers for the electrodes 30, 16, 40.

In this first embodiment, the floating capacitive coupler 50 is shown as overlapping the drive electrode 30 and the sense electrode 16. This arrangement is preferred so as to maximize interaction of electrical fields. The reason for maximizing interaction of electrical fields is to enhance coupling of a signal between the drive electrode 30 and the sense electrode 16. Thus, the floating capacitive coupler 50 is comprised of a conductive material. The conductive material can be the same conductive materials that are used to form the drive electrode 30 and the sense electrode 16.

Figure 4:
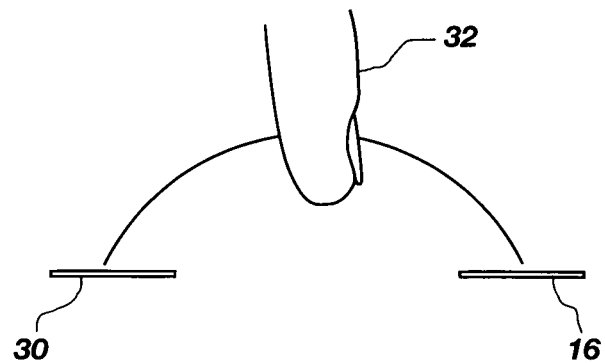
FIG. 4 is a view of a drive electrode, a sense electrode and a conductive pointing object from the prior art.

As explained previously, in a capacitive touchpad 10, a plurality of drive electrodes 30 emit electrical signals that are measured by a sense electrode 16. As shown in FIG. 4, the introduction of a pointing object 32 near the drive electrode 30 and the sense electrode 16, such as a human finger, has the effect of changing the voltage or charge that is coupled on the sense electrode. This figure is an end-view of the electrodes 16, 30. To measure the presence or the location of the pointing object 32 on or near to the touchpad 10, it is desirable that the pointing object have the maximum effect on the voltage or charge that is coupled on the sense electrode 16 by the signal from the plurality of drive electrodes 30.

Figure 5:
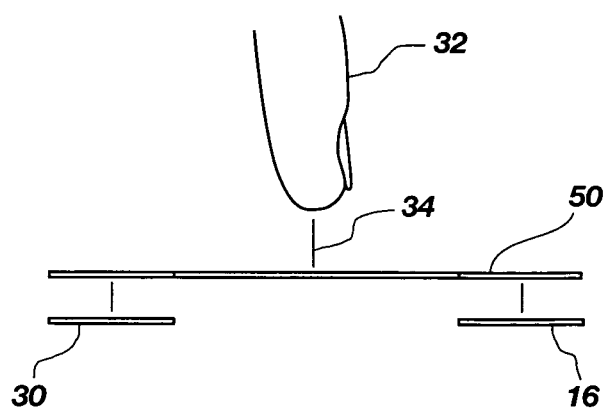
FIG. 5 is a view of a drive electrode, a sense electrode, a floating capacitive coupler and a conductive pointing object.

The present invention is a system and method for enhancing the effect of the pointing object on the coupling of the signal on the sense electrode 16. As shown in FIG. 5, enhancement of the effect of the pointing object 32 is a result of a new low impedance path 34 created between the pointing object and the floating capacitive coupler 50 when the pointing object is disposed over the floating capacitive coupler. The creation of the low impedance path 34 when the pointing object 32 is conductive has the effect of reducing the voltage or charge coupled on the sense electrode 16 by the signal from the drive electrode 30.

While the case above states that the pointing object 32 is a conductive material because it is often a human finger, it does not have to be one. The pointing object can also be an insulating object with high permittivity such as a specific type of stylus. In such a case, the pointing object 32 would have the opposite effect on coupling and will result in an increase in the voltage or charge coupled on the sense electrode 16. Thus, the floating capacitive coupler 50 will enhance the effect of the insulating pointing object by causing an increase in voltage or charge, and the conductive pointing object will cause a decrease in voltage or charge.

The essence of the present invention is thus the introduction of the floating capacitive coupler 50. FIG. 3 is obviously showing only a small segment of the drive electrode 30 and the sense electrode 16. In a capacitive touchpad 10, there will most likely be a plurality of drive electrodes 30 in a capacitive touchpad. There can also be more than one sense electrode 16. However, the exact arrangement of the drive electrodes 30, the sense electrode 16 and the floating capacitive coupler 50 will vary. What is important in the present invention is that the floating capacitive coupler 50 be disposed so as to be adjacent to both the drive electrode 30 and the sense electrode 16 so that the effect of the pointing object can be enhanced. In this embodiment, there is only a single floating capacitive coupler 50.

One aspect of the present invention is that the drive electrode 30, the sense electrode 16 and the floating capacitive coupler 50 can all be disposed within or on an insulating substrate 40. However, it is likely that the most effective arrangement of electrodes is where the floating capacitive coupler 50 is disposed nearest to a surface of the touchpad 10. In this way, the pointing object 32 can more easily interact with the electric fields between the drive electrode 30 and the sense electrode 16.

Figure 6:
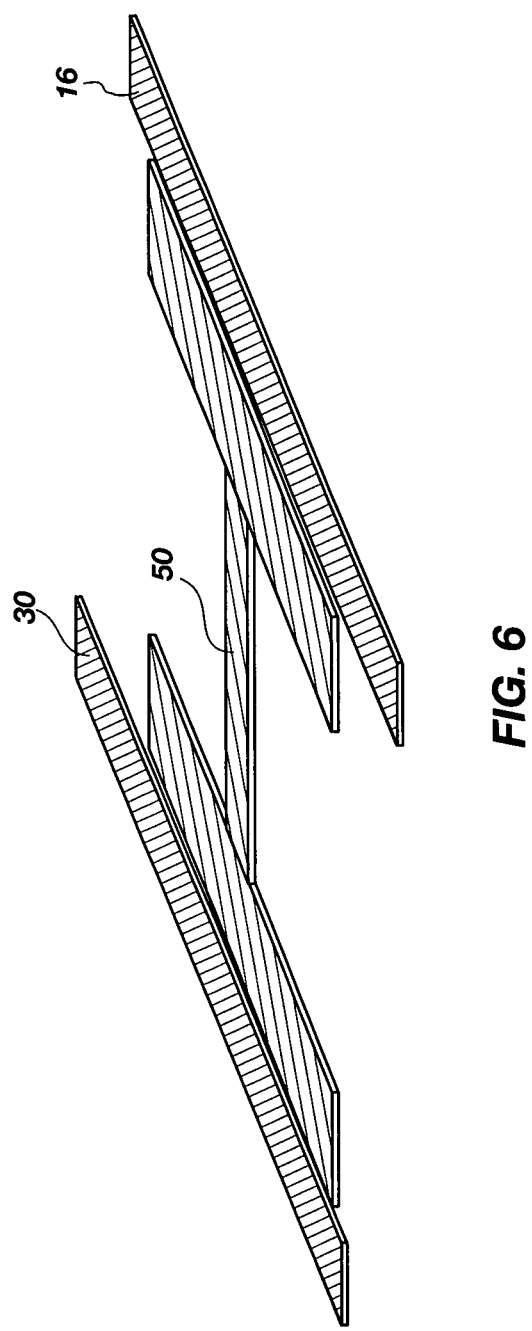
FIG. 6 is an alternative embodiment of an arrangement of the drive electrode, the sense electrode and the electrically floating capacitive coupler.

Nevertheless, the floating capacitive coupler 50 does not have to be disposed nearest to the surface of the touchpad 10. FIG. 6 shows an alternative embodiment of the present invention that introduces the concept of the drive electrode 30, the sense electrode 16 and the floating capacitive coupler 50 being disposed on a same plane of the substrate 40. In this arrangement, the present invention is relying on side wall capacitance between electrodes instead of the capacitance between different layers when the electrodes are arranged as in FIG. 3 to overlap.

Alternatively, the electrodes 16, 30, 50 can be arranged on two or three separate layers within the substrate 40. Thus, any of the electrodes 16, 30, 50 can be disposed alone on a layer or on a same layer as any other electrodes within the touchpad 10. What is important is that the floating capacitive coupler 50 is arranged so as to maximize coupling to the drive electrode 30 and the sense electrode 16.

In another alternative embodiment of the present invention, a consequence of enhancing the effect of the pointing object 32 on the coupling of a signal on the sense electrode 16 is that spacing between the drive electrode 30 and the sense electrode 16 can be increased without a reduction in sensitivity of the touchpad 10. This ability to increase spacing means that a touchpad 10 with a given number of drive electrodes can be increased in size when using a floating capacitive coupler 50 as opposed to a touchpad that does not have it.

The figures have shown the shape of the floating capacitive coupler in FIGS. 3 and 6 to be a large "H". However, it is another aspect of the invention that the shape of the floating capacitive coupler 50 is not limited to the "H" design. For example, a simple rectangular shape can also be used. What is convenient about the "H" design is that the floating capacitive coupler 50 provides a large surface adjacent to the drive electrode 30 and the sense electrode 16 to thereby enhance a coupling effect.

The shape and/or placement of the floating capacitive coupler 50 can also be modified to create different effects. For example, it is believed that the shape and/or placement of the floating capacitive coupler 50 can be changed to yield a more linear transfer curve between relative finger displacement and net voltage/charge coupled to the sense electrode 16.

It is another aspect of the invention that a single large floating capacitive coupler 50 is provided, or a plurality of smaller floating capacitive couplers are provided.

A final aspect of the present invention is to use an insulating material instead of a conducting material for the floating capacitive coupler 50. The insulating material has a high permittivity.

It is to be understood that the above-described arrangements are only illustrative of the application of the principles of the present invention. Numerous modifications and alternative arrangements may be devised by those skilled in the art without departing from the spirit and scope of the present invention. The appended claims are intended to cover such modifications and arrangements.

What is claimed is:

1. A method for increasing the effect of a pointing object that influences the coupling of a signal between electrodes of a capacitive sensor used in a touchpad, said method comprising:
   1) providing at least one drive electrode for generating a signal and at least one sense electrode for measuring a portion of the signal that is coupled to the at least one sense electrode;
   2) providing at least one permanently electrically floating capacitive coupler that is disposed so as to be in a fixed position relative to and adjacent to the at least one drive electrode and the at least one sense electrode, the floating capacitive coupler being disposed in a same plane and between the at least one drive electrode and the at least one sense electrode; and
   3) introducing a pointing object so as to be in proximity of the at least one drive electrode and the at least one sense electrode, wherein a presence of the pointing object is sufficient to cause a change in coupling of a signal between the at least one drive electrode and the at least one sense electrode, wherein the at least one electrically floating capacitive coupler enhances the effect of the change in coupling of the signal whenever a low impedance path created between the at least one electrically floating capacitive coupler and the pointing object.

2. The method as defined in claim 1 wherein the method further comprises the step of causing a decrease in coupling of the signal between the at least one drive electrode and the at least one sense electrode when the pointing object is a conductive material.

3. The method as defined in claim 1 wherein the method further comprises the step of causing an increase in coupling of the signal between the at least one drive electrode and the at least one sense electrode when the pointing object is an insulating material.

4. The method as defined in claim 1 wherein the method further comprises the step of disposing the at least one drive electrode, the at least one sense electrode, and the at least one electrically floating capacitive coupler within an insulated substrate.

5. The method as defined in claim 4 wherein the method further comprises the step of disposing the at least one drive electrode, the at least one sense electrode and the at least one electrically floating capacitive coupler on three separate planes within the insulated substrate.

6. The method as defined in claim 4 wherein the method further comprises the step of disposing the at least one drive electrode, the at least one sense electrode and the at least one electrically floating capacitive coupler on two separate planes within the insulated substrate, wherein two of the three electrodes are disposed on the same plane.

7. The method as defined in claim 4 wherein the method further comprises the step of disposing the at least one drive electrode, the at least one sense electrode and the at least one electrically floating capacitive coupler on a single plane within the insulated substrate.

8. The method as defined in claim 5 wherein the method further comprises the step of disposing the at least one electrically floating capacitive coupler nearest to a surface of a capacitive sensor to thereby enhance the effect of the pointing object.

9. The method as defined in claim 1 wherein the method further comprises the step of reducing a voltage induced on the at least one sense electrode by the at least one drive electrode.

10. The method as defined in claim 1 wherein the method further comprises the step of increasing spacing between the at least one drive electrode and the at least one sense electrode without reducing the ability of the at least one drive electrode and the at least one sense electrode to function as part of a capacitive sensor.

11. A system for increasing the effect of a pointing object that influences the coupling of a signal between electrodes of a capacitive sensor in a touchpad, said system comprised of:
   at least one drive electrode and means for generating a signal;
   at least one sense electrode and means for measuring a portion of the signal that is coupled to the at least one sense electrode; and
   at least one permanently electrically floating capacitive coupler that is in a fixed position relative to and disposed so as to be adjacent to the at least one drive electrode and the at least one sense electrode, the floating capacitive coupler being disposed in a same plane and between the at least one drive electrode and the at least one sense electrode such that when the pointing object is in proximity of the at least one drive electrode and the at least one sense electrode, the presence of the pointing object is sufficient to cause a change in coupling of a signal between the at least one drive electrode and the at least one sense electrode whenever a low impedance path is created between the at least one electrically floating capacitive coupler and the pointing object.

12. The system as defined in claim 11 wherein the system is further comprised of an insulated substrate, wherein the at least one drive electrode, the at least one sense electrode and the at least one electrically floating capacitive coupler are disposed within the insulated substrate.

13. The system as defined in claim 12 wherein the at least one drive electrode, the at least one sense electrode and the at least one electrically floating capacitive coupler are disposed on three separate planes within the insulated substrate.

14. The system as defined in claim 12 wherein the at least one drive electrode, the at least one sense electrode and the at least one electrically floating capacitive coupler are disposed on two separate planes within the insulated substrate, wherein two of the three electrodes are disposed on the same plane.

15. The system as defined in claim 12 wherein the at least one drive electrode, the at least one sense electrode and the at least one electrically floating capacitive coupler are disposed on a single plane within the insulated substrate.

16. The system as defined in claim 13 wherein the at least one electrically floating capacitive coupler is disposed nearest to a surface of a capacitive sensor.

17. The system as defined in claim 11 wherein spacing between the at least one drive electrode and the at least one sense electrode is increased without reducing the ability of the at least one drive electrode and the at least one sense electrode to function as part of a capacitive sensor.

18. The system as defined in claim 11 wherein the at least one electrically floating capacitive coupler is disposed adjacent to a plurality of drive electrodes and at least one sense electrode.

19. The system as defined in claim 11 wherein the at least one electrically floating capacitive coupler includes at least a portion that overlaps on a separate plane the at least one drive electrode and the at least one sense electrode.

20. The system as defined in claim 11 wherein the at least one electrically floating capacitive coupler includes at least a portion that is disposed immediately adjacent to an edge of the at least one drive electrode and the at least one sense electrode in a same plane.

21. The system as defined in claim 11 wherein the at least one drive electrode and the at least one sense electrode are disposed orthogonally to each other in separate planes of an insulated substrate.

* * * * *